(12) United States Patent
Carson et al.

(10) Patent No.: US 7,794,577 B2
(45) Date of Patent: Sep. 14, 2010

(54) SPACER FOR FILLED CELL ELECTRODIALYSIS

(75) Inventors: William W. Carson, Hopkinton, MA (US); Oleg Grebenyuk, Woburn, MA (US); Vladimir Grebenyuk, Woburn, MA (US); Keith J. Sims, Wayland, MA (US); R. Hilda Zanapalidou, Winchester, MA (US); Bernard R. Mack, Natick, MA (US); Richard G. Parent, Waltham, MA (US)

(73) Assignee: Ionics, Incorporated, Watertown, MA (US)

( * ) Notice: Subject to any disclaimer, the term of this patent is extended or adjusted under 35 U.S.C. 154(b) by 1216 days.

(21) Appl. No.: 10/495,394

(22) PCT Filed: Nov. 16, 2002

(86) PCT No.: PCT/US02/37429
§ 371 (c)(1), (2), (4) Date: Feb. 12, 2007

(87) PCT Pub. No.: WO03/43721
PCT Pub. Date: May 30, 2002

(65) Prior Publication Data
US 2007/0138008 A1 Jun. 21, 2007

Related U.S. Application Data

(60) Provisional application No. 60/335,856, filed on Nov. 16, 2001, provisional application No. 60/354,246, filed on Feb. 2, 2002.

(51) Int. Cl.
*B01D 61/46* (2006.01)
*B01D 61/48* (2006.01)
*B01D 61/50* (2006.01)
*B01D 61/52* (2006.01)

(52) U.S. Cl. .............. 204/638; 204/600; 204/627; 204/630; 204/632; 204/636; 204/639

(58) Field of Classification Search .......... 204/260, 204/600, 632, 627, 630, 636, 638, 639
See application file for complete search history.

(56) References Cited

U.S. PATENT DOCUMENTS

| | | | |
|---|---|---|---|
| 4,303,493 A | 12/1981 | Kneifel et al. | |
| 4,465,573 A | 8/1984 | O'Hare | |
| 4,632,745 A * | 12/1986 | Giuffrida et al. | ............ 204/632 |
| 4,701,234 A | 10/1987 | Rogemont et al. | |
| 5,185,048 A | 2/1993 | Guerif | |

FOREIGN PATENT DOCUMENTS

WO WO 00/75082 12/2000

* cited by examiner

*Primary Examiner*—Bruce F Bell
(74) *Attorney, Agent, or Firm*—David Silverstein; Andover-IP-Law

(57) ABSTRACT

A spacer element (1) is disclosed having an integral screen for use in filled cell electrodialysis. The spacer (1) has a continuous portion (2) impermeable to flow and a screen (3) which spans a centrally-located flow treatment region that contains active treatment material, such as ion exchange beads. The screen (3) may perform a structural function, allowing operation at elevated pressure, and may also define a minimum gap between adjacent membranes and enhance mixing along the flow path and at cell boundaries. The spacer element (1) may be configured to enhance hydraulic filling of the cells, and cell architecture is readily implemented in a wide range of useful flow path geometries utilizing the screen spacer element (1).

24 Claims, 7 Drawing Sheets

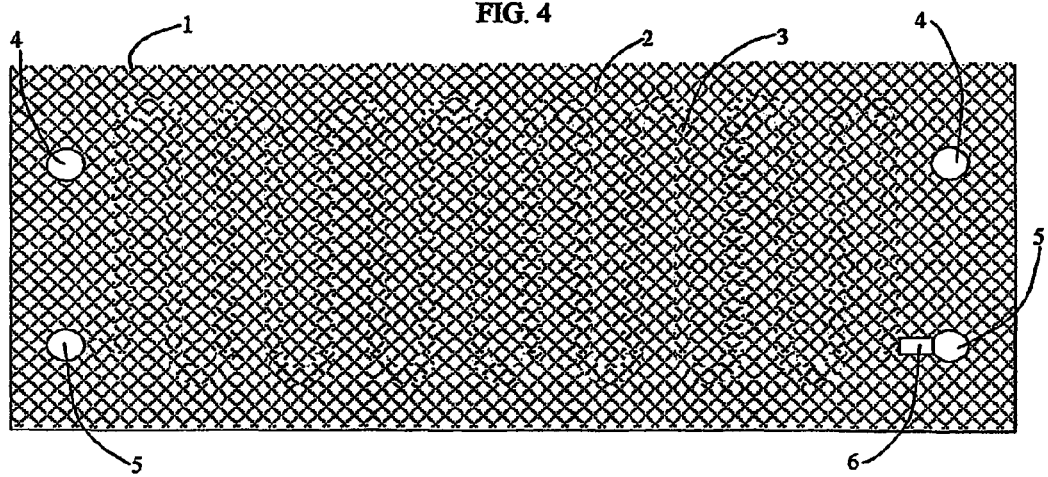
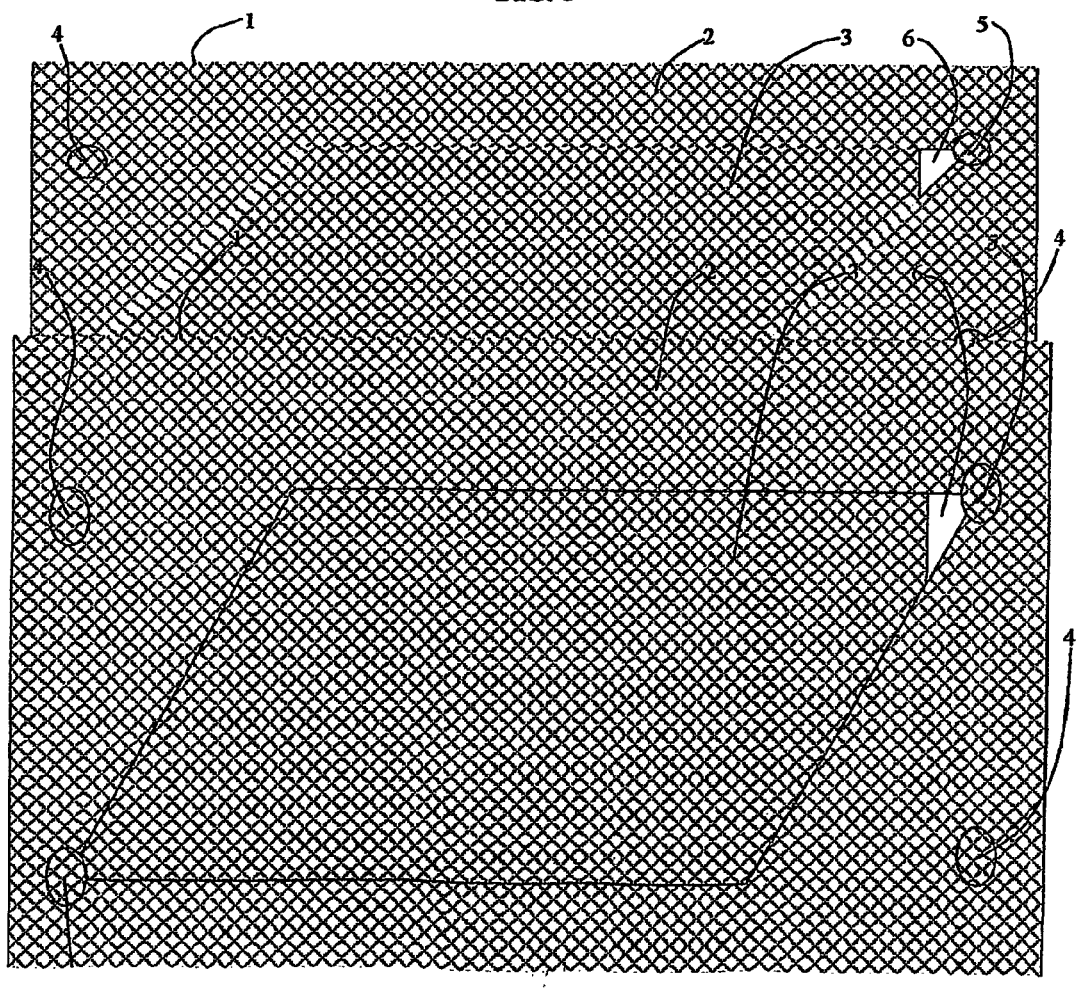

SPACER FOR FILLED CELL ELECTRODIALYSIS

CROSS-REFERENCE TO RELATED APPLICATIONS

This application is a 371 of PCT/US02/37429 filed Nov. 16, 2002, which claims benefit of U.S. Ser. No. 60/335,856 filed Nov. 16, 2001, and also claims benefit of U.S. Ser. No. 60/354,246 filed Feb. 2, 2002.

The present invention relates generally to improved spacer elements for use in an electrodialysis device, such as in filled cell electrodialysis. A spacer element in accordance with this invention includes a mesh or screen positioned in a liquid flow path between membrane elements or alongside a membrane element within a cell. The mesh or screen provides controlled membrane spacing as well as enhanced mixing along boundaries of the flow region within the cell, and constitutes a cross lattice or structural reinforcement against bowing under pressure. A functional packing, such as ion exchange or other active material, is retained in the cell. Different embodiments of the present invention provide cells with a wide range of flow path geometries to accommodate different system uses and specifications.

BACKGROUND AND FIELD OF THE INVENTION

The invention pertains to filled spacers for filled cell electrodialysis apparatus, commonly called EDI or electrodeionization apparatus. EDI apparatus is commonly implemented as a rectangular or cylindrical "stack" of spaced-apart selectively permeable membranes, or as a spiral-wound module of such membranes, in which the structural geometry of the stack elements and selective membrane permeabilities define alternating dilute and concentrate cells positioned between two or more electrodes. A first liquid feed is flowed through the dilute cells and, in passing through the cells, gives up its undesired mineral content to exchange resin in the cells. The captured mineral species are then transported through selectively permeable anion or cation exchange membranes into adjacent concentrate cells, where the species are flushed by a separate second fluid flow. External plumbing and suitable power switching circuitry may be provided to allow some constructions to be operated as reversing electrodeionization ("EDIR") units, which are operated by periodically reversing the polarity of the electrodes and interchanging the flows through the dilute and concentrate cells.

A variety of constructions for the spacer or frame elements of a filled cell electrodialysis apparatus (including EDI, EDIR, and electrodiaresis units) are known, for example, as described in U.S. Pat. Nos. 2,923,674; 4,465,573; 4,632,745; 5,120,416; 5,292,422 and 6,123,823 among others. Each of these patents is hereby incorporated herein by reference. In these prior art spacer constructions, each liquid flow path is typically an open or unobstructed region of a cell bounded by membranes and spacer walls, and filled, at least in part, with functional material such as ion exchange beads, felt, fibers or the like. Constructions typically involve a spacer frame that surrounds the cell providing an enclosed chamber and also supporting the edges of consecutive selectively permeable membranes so that the membranes are spaced apart by the nominal spacer or frame thickness. Ribs, posts or other elements, either integral with the spacer frame or added during assembly, may support the membranes apart at intermediate positions and define sub-compartments or narrow, parallel flow paths within the area of the overall frame/spacer.

These known constructions and methods of maintaining separation between the membranes of filled cell electrodialysis cells depend upon the mechanical strength of the membrane to assure that the membranes support themselves across the limited span between ribs or supports. Thus, for example, several manufacturers have employed solid ridges or ribs spaced no more than a few inches apart to separate the EDI flow cells into parallel long, narrow, flow channels between the two broad area membranes. The width, thickness and mechanical modulus or strength of the material used in the spacers or frames has also imposed limits on the width of fluid flow paths and the maximum operating pressures and temperatures of these stacks. When long rectilinear flow compartments are employed, the flow distribution in the sub-compartments or flow channels defined by such supported spans of membrane may be subject to edge effects at interfaces between membrane and spacer side walls, creating regions of low or dead flow, and also causing channeling or bypassing by the liquid flow, all of which can result in less than optimal fluid treatment or sub-optimal stack performance. The cells are typically filled with a swellable body of ion exchange beads that must be maintained in physical contact with the exchange membranes to effect proper ion transport. The proper filling of a dilute cell with a suitable quantity of an appropriate mixture of ion exchange beads to maintain stable membrane spacing and support, assure conductive contact of the resin, and provide an appropriately low flow impedance is not a straightforward task but rather one that may involve considerable experimentation.

In the concentrate cells of such EDI apparatus, particularly in stacks not designed for reversal operation (EDIR), the flow cells typically have no ion exchange filling and the membrane spacer/frame may be generally of thinner construction. For these unfilled cells, a screen or mesh material has often been used to support the membranes apart and to assure a non-occluded liquid flow path between the membranes. The screen thus serves as a dimensional spacer in the thickness direction transverse to the plane of liquid flow. Such a concentrate cell screen-type spacer may consist of one or more layers of a sheet-like mesh material, and is typically configured to provide a relatively low flow impedance (e.g., a sufficiently unobstructed flow cross-section), while the fibers constitute small local obstructions that enhance flow turbulence at the membrane surfaces thus causing this flow to efficiently carry off the species that have been removed from the first liquid flow and transported across the membrane by ionic conduction. Such operation maximizes one factor involved in the transfer efficiency. The mesh may be a relatively limp gauze-like material, a thin non-woven heat-extruded mesh, or a somewhat extensible and/or compressible fabric having a tricot-like fiber geometry.

In addition to the above-described constructions of bead-filled dilute cells and screen-containing concentrate cells, various other constructions have been considered. Some researchers have proposed, for example, that the spacer frame elements, or even the screen/mesh itself be formed of ion exchange material, that a cell filling include ion-exchange felt or textile, or that the ion exchange membranes incorporate ion exchange fibrils that project from the membrane surface into a fluid flow path, but various cost and practical construction factors have limited commercial implementation of such proposals.

Most of the membrane, resin and spacer materials used in these devices are polymeric, and both the resin and the membrane materials are typically swellable in use. Thus, whatever specific constructions may be employed, the provision of thin, resin-holding flow cells defined between many sets of parallel ion exchange membranes that are separated by spacer frames, poses a complex problem of hydraulics, chemical engineering and structural design. The construction must be stacked and bolted closed to form a hydraulically sealed vessel comprised of many well-defined thin flow cells, and it must simultaneously provide good flow and effective ion-exchange treatment conditions without giving rise to excessive membrane stress or damage, or bulging, cracking or leakage of the spacer frames, and without impairing the operation or long term performance of the stack as a whole.

SUMMARY OF THE INVENTION

The present invention provides an improved spacer for an electrodialysis apparatus which has been found to be particularly useful in the filled cells of a filled cell electrodialysis (e.g., electrodeionization or EDI) apparatus. The spacer includes a screen, that, in one aspect provides support to maintain a minimum spacing between the successive membranes bounding the cells of the device. In another aspect, the screen operates as a structural element enhancing the mechanical strength and integrity of the spacer perimeter wall. Screen strands provide distributed tensile cross members mechanically reinforcing the spacer to resist bowing or blowout at elevated operating pressure or temperature. In another aspect, the screen is constituted by fibers or strands, which may be sized and/or positioned to enhance fluid mixing at interfaces between membranes and spacer side walls, reducing or eliminating undesirable short circuiting effects of liquid flowing faster along the intersection of functional packing with spacer walls. Fiber cross section may be further shaped to minimize bead-trapping or orphan bead isolation (e.g., trapping of isolated anion exchange beads adjacent the cation exchange membrane, or cation exchange beads against the anion exchange membrane, thereby limiting or impeding ion transport). Mixing effected by screen strands in such filled cells in accordance with this invention has been found to enhance performance and improve product quality. Additionally, it has been found that screen strands provide mixing of fluid flow at intersections of packing material, membrane surfaces and spacer side walls. Screens in accordance with the present invention allow fluid flow paths to be designed over a wide range of geometries to accommodate a wide range of needs.

As applied to an EDI apparatus having a packing of exchange beads, screens of the invention may be used in conjunction with a very thin or sparse filling of such beads to provide high hydraulic permeability and to avoid excessive pressure drops for the liquid to be treated. For such design, a screen may be thinner than the largest or nominal bead diameter and have at least one strand layer thinner than the diameter of the smaller particles of the packing. This construction holds the beads in place and may substantially eliminate the need for a larger, structural particle retainer assembly for the active particulates or packing between the membranes.

Relatively thick screen members in accordance with this invention having at least one strand layer significantly larger than largest particle diameters are readily filled by processes similar to those previously employed for filling screen-free cells. They can, for example, be hydraulically, pneumatically or hydro-pneumatically filled as described in U.S. Pat. Nos. 5,066,375; 5,120,416 and 5,203,976, which patents are incorporated herein by reference, and in commonly-owned U.S. provisional patent application Ser. No. 60/354,246, filed on Feb. 2, 2002, which is also hereby incorporated herein by reference in its entirety.

The screen spacers of the present invention can also be applied in EDI units of spiral or of cylindrical stack configuration.

BRIEF DESCRIPTION OF THE DRAWINGS

These and other features of the present invention will be understood from the description and claims herein, taken together with the drawings illustrating details and representative embodiments of the invention, wherein

FIG. 4 is a diagrammatic plan view of a fourth filled screen spacer of the invention showing a serpentine flow path geometry;

FIG. 5 is a diagrammatic plan view of another screen spacer of the invention illustrating another flow path and cell geometry;

DETAILED DESCRIPTION OF PREFERRED EMBODIMENTS

Figure 1:
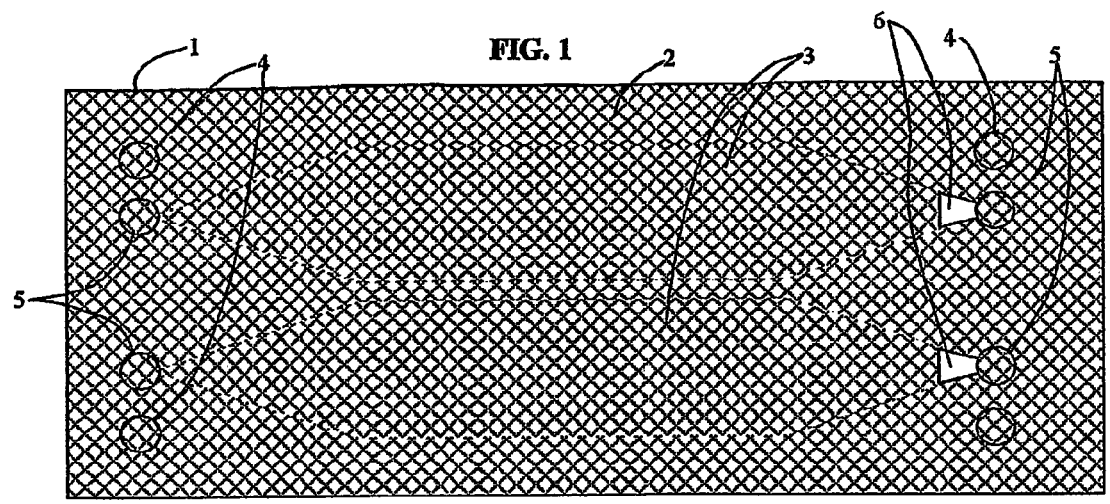
FIG. 1 is a diagrammatic plan view of a first filled screen spacer of the invention showing a first flow path and cell geometry.
Figure 2:
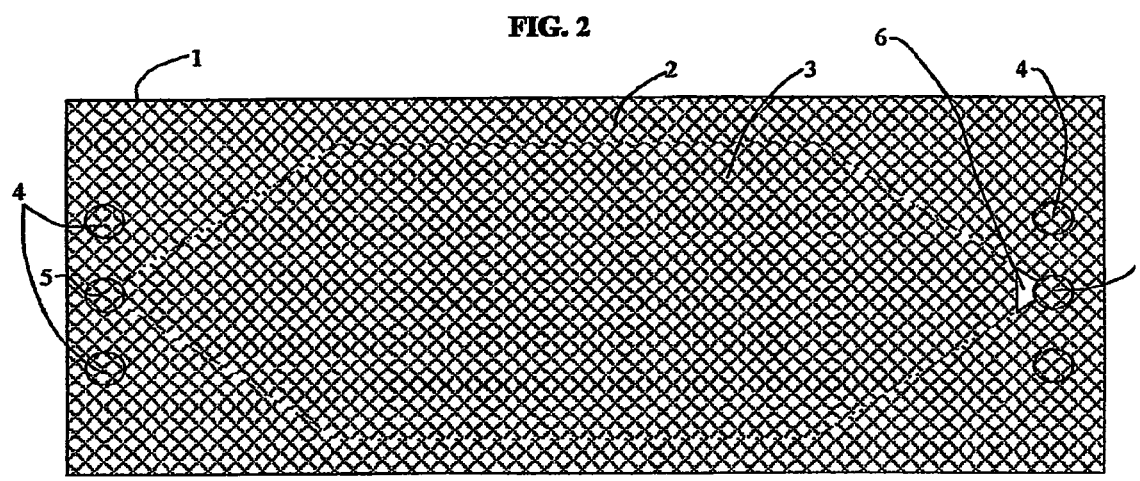
FIG. 2 is a diagrammatic plan view of a second filled screen spacer of the invention showing another flow path and cell geometry.

FIGS. 1 through 6 show diagrammatic plan views of different screen spacer designs in accordance with the present invention to illustrate a range of possible flow cell geometries and construction details. The screen spacers, all denoted by reference numeral 1 for purposes of illustration, are all intended for a rectangular, frame-type EDI stack, and thus have a thin, flat, generally rectangular and planar aspect, for which details of possible flow channels, ports and shape will be discussed. However, one of ordinary skill in this art will understand and appreciate that the various illustrated embodiments of the invention may be applied, with suitable modifications, to other known EDI device architectures, including EDI devices formed as a cylindrical stack of flat disk-shaped cells, and devices having spiral-wound cells in an overall cylindrical shape; and, each of these alternative EDI device architectures embodying a screen element in accordance with this invention is considered to be a part of and within the scope of this invention.

In each case, the screen spacer comprises a fluid-permeable screen or mesh portion 3 comprised of a lattice of crossing strands or fibers, and a substantially fluid-impermeable continuous perimeter region or portion 2, shown more darkly shaded than the mesh portion 3, that is present in at least the perimeter portion of the rectangular region of the spacer element and defines, when the stack is assembled, the bounding side walls of an EDI flow cell. The continuous portion 2 is impermeable or substantially impermeable to bulk flow. Each of the screen spacer embodiments shown in FIGS. 1-6 is made with screen throughout the rectangular region of the spacer element, the screen being sealed to liquid passage at least within the continuous portion 2 around the perimeter, and is of generally uniform thickness so that continuous portion 2 seals against adjacent ion exchange membranes on either or both sides thereof when arranged in an EDI stack. While the illustrated embodiments show the screen extending all the way to the outer four edges or borders of the rectangular spacer body, in other embodiments (not shown) the screen may terminate within continuous portion 2 but short of one or more of the edges. In any case, the screen portion extending into region 2 is preferably sealed on both sides with or so as to form continuous portion 2, so that the strands of the screen mesh extend across the spacer element and provide structural resistance to spreading or expansion outwardly in any direction within the plane of the spacer element. The screen further provides enhanced mixing of the liquid flow, including mixing along the edges or perimeter boundaries of the flow cell defined in part by each spacer element. In the central open region the screen also provides a distributed flow-permeable support of the membranes to assure they maintain a minimum spacing that enhances control of the hydraulic flow and fluid contact with the ion exchange material while suitable electrical fields are applied to effect ion removal.

Extending the screen beyond the flow cell and into the fluid-impermeable region 2 advantageously increases in-plane tensile strength of the spacer elements to permit higher operating pressures without significantly deforming the spacers. Moreover, by providing a screen integrated with fluid-impermeable region 2, the resulting spacer element may have enhanced surface area and load-bearing capacity because its cross-sectional area need not be cut away excessively to assure that other EDI components can be inserted into the spacer. Instead, with the spacer elements of this invention, screen and solid portions are each substantially flat sheet, and any further openings needed may be simply punched or cut therefrom.

The screen spacer 1 is stacked, typically with a cation exchange membrane on one side and an anion exchange membrane on the other side, so that the open central screen region of fluid-permeable mesh portion 3 defines a flow cell, while the inner edges of fluid-impermeable region 2 define the lateral walls of the cell, and the planar faces of portion 2 seal to membranes on each side thereof. In a preferred embodiment as illustrated, a first set of apertures 4 is positioned within the fluid-impermeable region 2 to provide a manifold through the EDI stack that does not communicate with the open central flow region (where mesh portion 3 is located). These apertures 4 may serve as the respective concentrate inlet and concentrate outlet for concentrate cells which are positioned immediately adjacent to the dilute cell and have their geometry defined by suitably configured concentrate cell spacers—e.g., concentrate spacers having a set of openings in registry with apertures 4 but which do communicate with their respective open central flow regions. Similarly, another set of apertures 5 may serve respectively as the dilute cell inlet and outlet. Apertures 5 are positioned to allow bulk fluid flow communication with the open central flow regions of the illustrated spacer elements. In preferred practice, dilute manifold openings 5 would be located in registration with similar openings that pass through the fluid-impermeable regions of the concentrate spacers.

Figure 3:
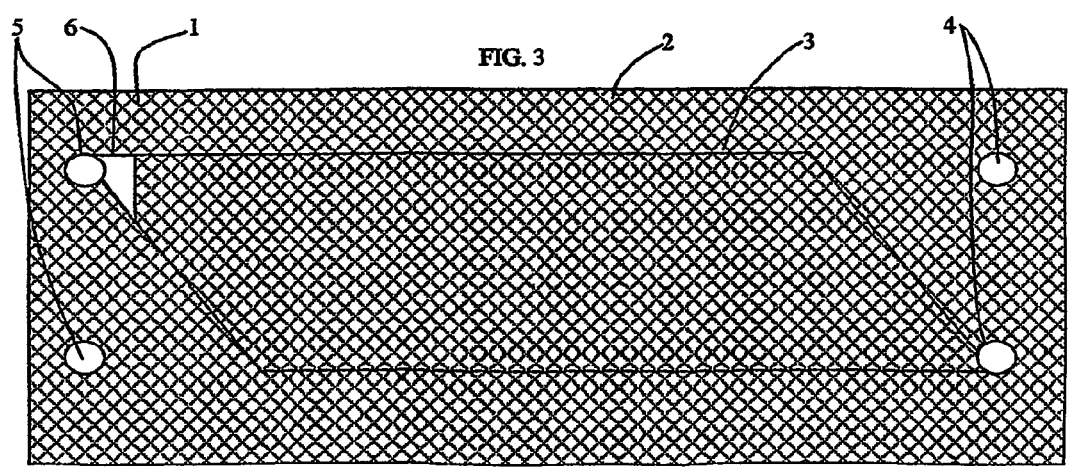
FIG. 3 is a diagrammatic plan view of another filled screen spacer of the invention showing details of manifold construction.
Figure 6:
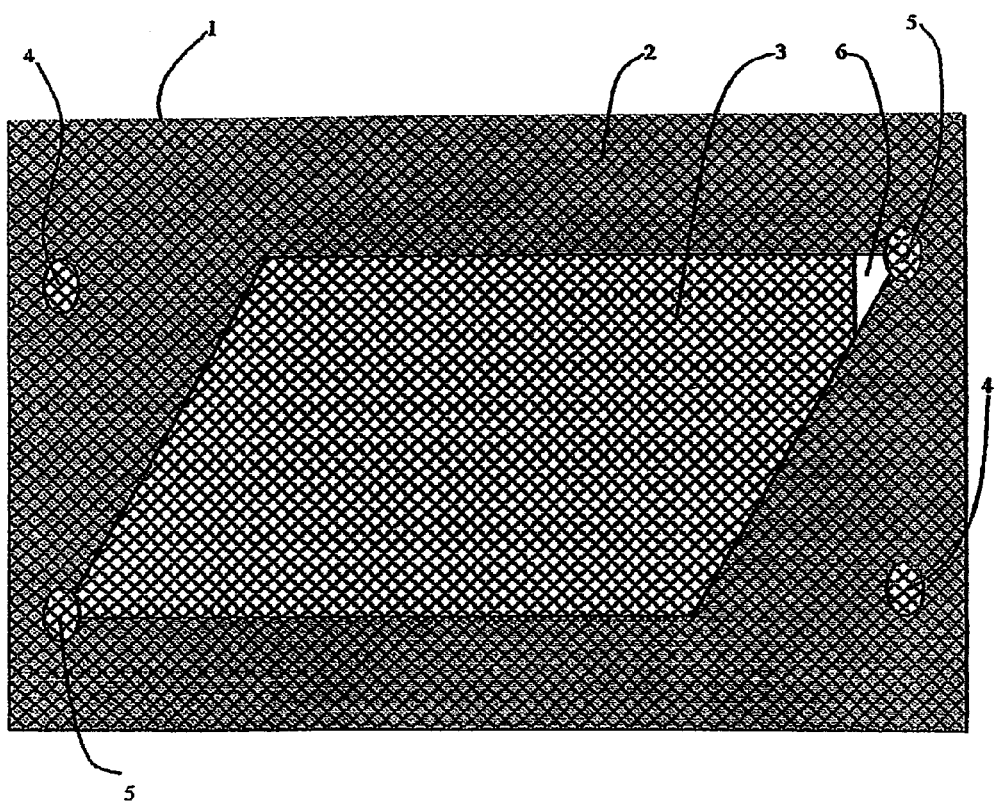
FIG. 6 is a diagrammatic plan view of yet another filled screen spacer of the invention showing another flow path and cell geometry.

The screen integrated in this manner with the continuous spacer portion may extend across these aperture openings 4 and 5 thus providing a continuous internal web reinforcement essentially co-extensive with the dimensions of the spacer element for greater mechanical strength and for operation at higher pressures. The screen may, alternatively, be removed (for example, punched out) from such aperture or manifold areas. FIGS. 1, 2, 5, and 6 show manifold openings where screen extends across manifold holes, while FIGS. 3 and 4 show manifold openings where the screen does not extend across manifold holes. The figures also show a particulate retaining assembly, e.g., a bead retainer element 6, placed just upstream of the outlet of the cell (i.e., the outlet aperture 5) to prevent the filing medium from migrating to and clogging the manifold or port region. Various assemblies such as felts, laminates, mesh filters or injection-molded channel or grid inserts, or other strainer-type elements may be used for this purpose.

It will be appreciated that the concentrate cells may also be defined by spacer elements in accordance with this invention, and these cells may also be filled with particulates or beads and provided with bead retainers as discussed above. Such filling of concentrate cells is advantageous when the conductivity of the expected concentrate stream is relatively low.

The construction of a uniform thickness spacer element having a screen integrated therein in accordance with this invention in order to define the flow cell allows an enormous range of possible flow path geometries. In addition, the screen which is thus integrated into the flow cell may be selected to effect desirable system properties and/or realize certain performance characteristics, as described further below, in addition to membrane spacing and anti-blowout strengthening of the cell.

Figure 7:
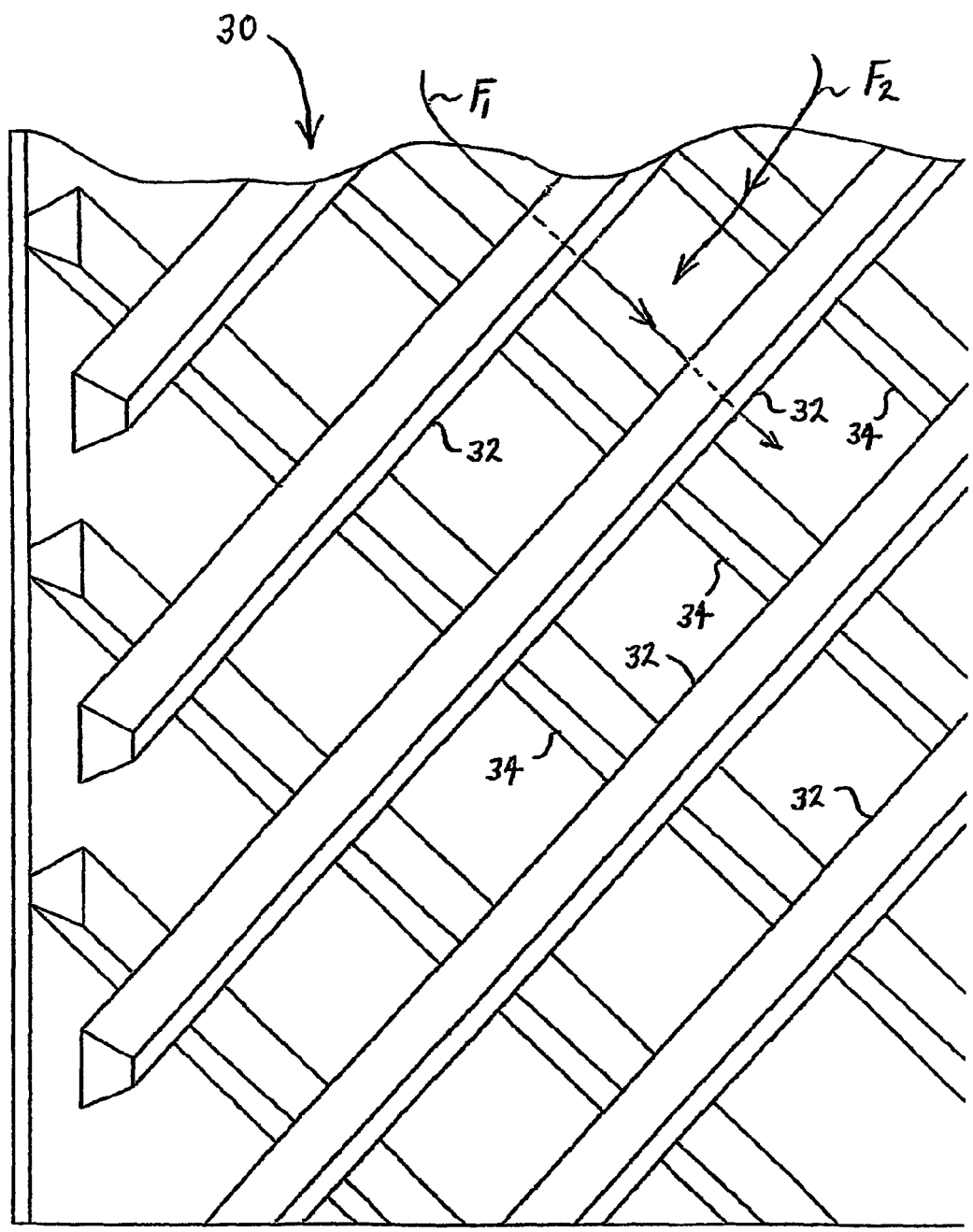
FIG. 7 is a drawing of one suitable screen element that may be used in this invention, illustrating relevant details of screen strand or fiber structure.

FIG. 7 schematically illustrates one type of screen 30 that may be used to construct a filled spacer element in accordance with this invention. Preferably, such screen is a non-woven type screen, such as those made by Nalle Plastics and Applied Extrusion Technology. Cross sections of screen strands used for screen 30 may be of any desired shape, for example, round, oval, rectangular, triangular, trapezoidal, parallelepiped, hexagonal, etc., and strands of one layer may be of the same size and shape or of different size and/or shape. Crossing screen strands may be bonded or fused at many, or even substantially all, intersections. Other types of screens such as woven, expanded, perforated, or corrugated screens may also be used, but are not as preferred for purposes of this invention.

Figure 8:
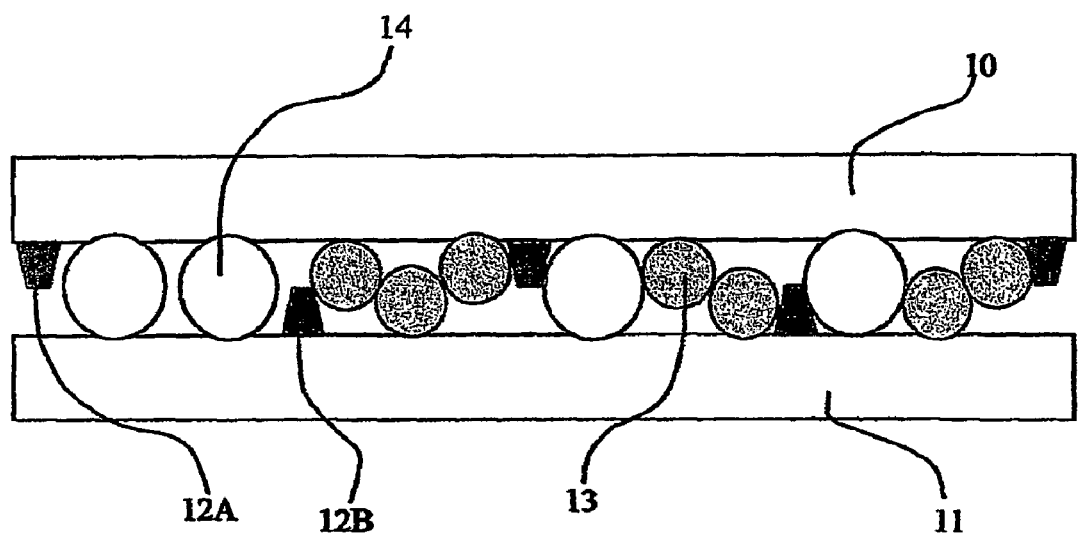
FIG. 8 is a schematic sectional view of the central flow region of a thin screen spacer of the invention having ion exchange beads loaded between the bounding membranes.

In a preferred embodiment of a screen 30 as shown in FIG. 7, the screen strands comprise two distinct sets of strands, which will be termed warp strands 32 and weft strands 34 by analogy with textile terminology. The warp and weft strands extend transverse to each other. The warp strands 32 along one side of a screen would contact a first membrane, while the weft strands 34 along the other side of the screen would contact a second membrane. Preferably, the strands 32 and 34 are oriented on the bias, that is, they extend diagonally across the nominal direction of the inlet-outlet flow axis through the cell. Screens in accordance with this invention may have more than two layers of crossing strands. Advantageously, the screen element supports the adjacent membranes in a substantially parallel planar orientation to each other, with the strands of the screen defining a certain minimum fixed spacing between the membranes, substantially irrespective of variations which might be introduced by resin swelling or by resin redistribution or maldistribution in the concentrate and/or dilute cells. In addition, the presence of strands running transverse to each other at the respective membrane faces provides both a high open flow cross-section and an effective source of turbulence in the liquid flow. The thickness of a strand may range from below one up to many tens of bead diameters. The open distance between a strand that contacts one membrane and the next membrane, that the strand does not contact, may range from about less than one diameter, as shown in FIG. 8, to many tens of bead diameters. In preferred embodiments, of this invention, the screen is molded into perimeter walls of spacer frames. Alternatively, the screen can also be attached to spacer frames by various mechanical means, for example using an adhesive, welding or other suitable bonding process. The screen may also be configured as an independent insert. The screen may also be of woven material, or made from expanded polymer sheets or from corrugated, perforated plastic sheet. In some embodiments, the screen may be ion exchange functionalized throughout or at least along its surfaces. A screen in accordance with this invention may also have the warp strands be of one exchange functionality and the weft strands be of the other functionality and lying in a different contact plane. In another preferred embodiment, the screens are bonded to the respective adjacent membranes.

In one embodiment schematically illustrated in FIG. 8, the thickness of a screen may be less than or only slightly larger than the nominal diameter of the bead filling, while the screen strands 12A and 12B are about only a few particulate diameters apart. However, the screen mesh size may be larger, for example up to about a hundred particle diameters. FIG. 8 schematically illustrates another desirable feature which may be included in some embodiments of the invention. In FIG. 8, the ion exchange or other particulates or beads 13, 14 are constrained by the warp and weft screen strands, respectively 12A and 12B, and also by adjacent membranes 10 and 11. In this embodiment, the screen strands are not round but rather have flat sides that are oriented to contact the membrane at an obtuse angle, thereby forming a slope that does not trap small particles. Thus, small beads or broken beads fragments, e.g., of one exchange type, are less likely to get trapped by an overhang or side of the fiber against the membrane of opposite type. The trapping of orphan beads against a membrane that will not accept the type ions captured by that type of bead could otherwise lead to increased contamination of the water or other liquid being processed, slow speed in achieving product water quality, increased power consumption or other inefficiencies. It has been found that the presence of strands at different levels and the orientation of the strands generally at an angle to the flow direction further aids in preventing microparticle particle trapping and in washing debris out of the region of flow.

One useful embodiment of the screen spacer of the invention may be formed with a spacer thickness of about two to a few tens of particle diameters, and the stack utilizing these spacers may be filled with anion exchange beads in contact with the anion exchange membranes and with cation exchange beads in contact with cation exchange membranes. For thicker cells, the screen may advantageously prevent rearrangement of the beads and also provides hydraulic mixing of the liquid flow.

Spacer frames and screens for this invention may be fabricated from virtually any nonconductive plastic or elastomeric material capable of withstanding the chemical environment, temperatures, and pressures of liquid streams without significant structural impairment or chemical degradation. Strands comprising such screens may intersect at angles ranging from about 5 degrees to 90 degrees. The distance between screen strand intersections is preferably between about 2 millimeters and about 100 millimeters. More preferably, such distance between screen strand intersections is between about 5 and about 50 millimeters. Orientation of screen strands to the direction of liquid flow may be varied from about 1 degree to about 90 degrees. In a preferred embodiment, screen strands intersect at about 90 degrees, and the orientation of strands to direction of liquid flow is about 45 degrees.

In another preferred embodiment the screen material may comprise ion exchange materials, or the screen may be surface-treated so that at least most exposed surfaces of such screen have ion exchange functionality.

Spacer elements in accordance with this invention may be filled with ion exchange materials and/or with other particulates during assembly of an electrodeionization cell stack, or may be filled with such functional particulates after the stack is assembled. When filling is to be performed after assembly of the stack, the filling operation may be performed by pumping an aqueous mixture, or an air-water slurry, of the ion exchange beads or other particulates into the stack, for example through the apertures of the screen spacers into the flow cells as taught above, utilizing techniques similar to those described in the previously-cited prior art patents and in the cited commonly-owned provisional patent application. For this purpose the inlet manifold or outlet manifold may be used, or one or more additional apertures may be specially provided to allow such cell filling. When the cell is to be externally filled with a bead mixture, the cell thickness is preferably between several, e.g., two or three, and about ten bead diameters thick, and the screen mesh portion 3 is preferably configured to aid in the uniform flow distribution of beads. (For single-type exchange bead filling protocols, the cell thickness can be much greater.) The screen is arranged such that its strands form guide rails arranged to channel fluid flow across the flow cell. For example, when fluid enters at one port 5 (in any of FIG. 1-3, 5 or 6), the strands of the screen may be relatively large and straight "rails" that run straight across to sides or ends of the cell, thereby guiding the bead-laden slurry to cover the entire area of the flow cell. The bi-layer construction shown in FIG. 7 is especially advantageous in this regard. The strand cross-dimension may be on the order of a millimeter, with a relatively larger 2-10 millimeter mesh, providing relatively high but guided fluid flow. The nature of the filling flow distribution in two planes and along two directions is schematically indicated by arrows $F_1$ and $F_2$ in FIG. 7, thereby accessing the entire volume of the cell without allowing the beads to settle out or block the flow.

Figure 9:
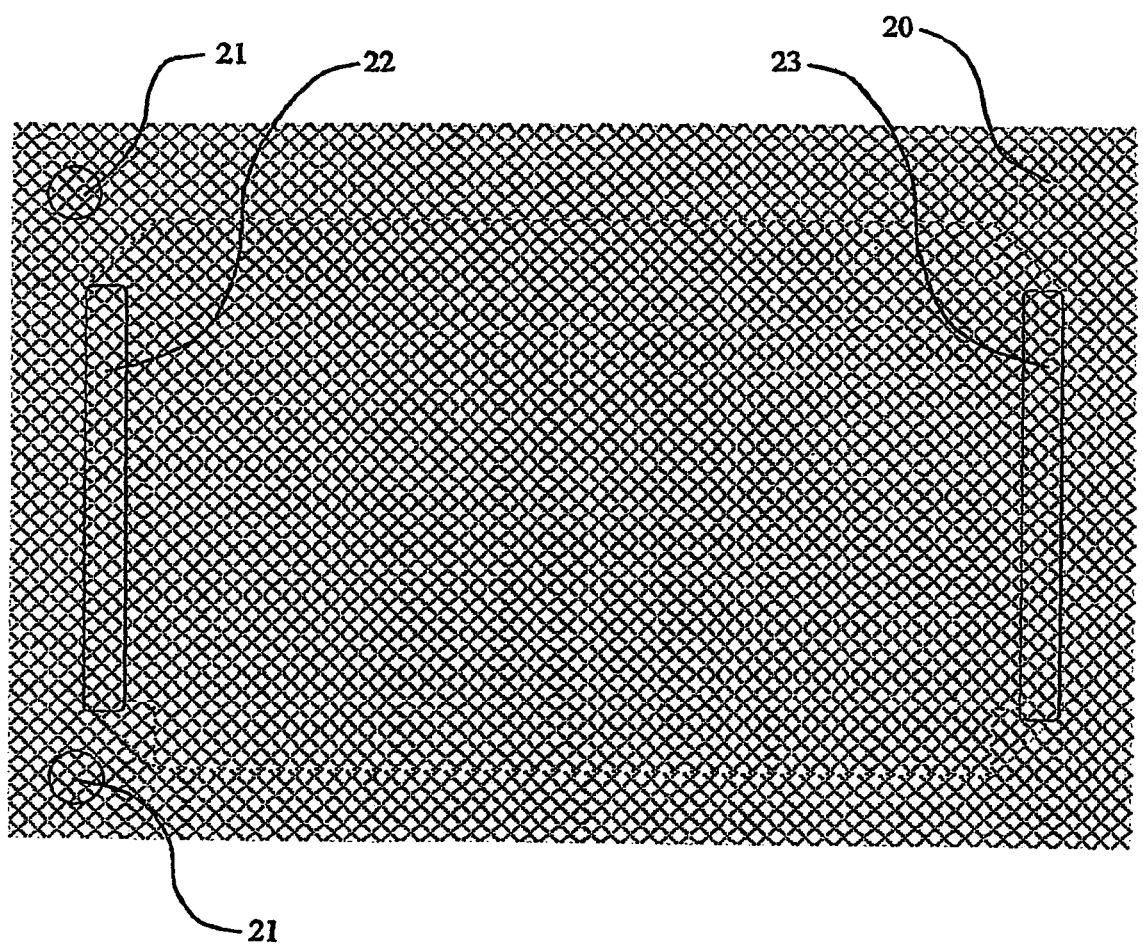
FIG. 9 is a plan view of an embodiment having a common product outlet and concentrate inlet manifold.
Figure 10:
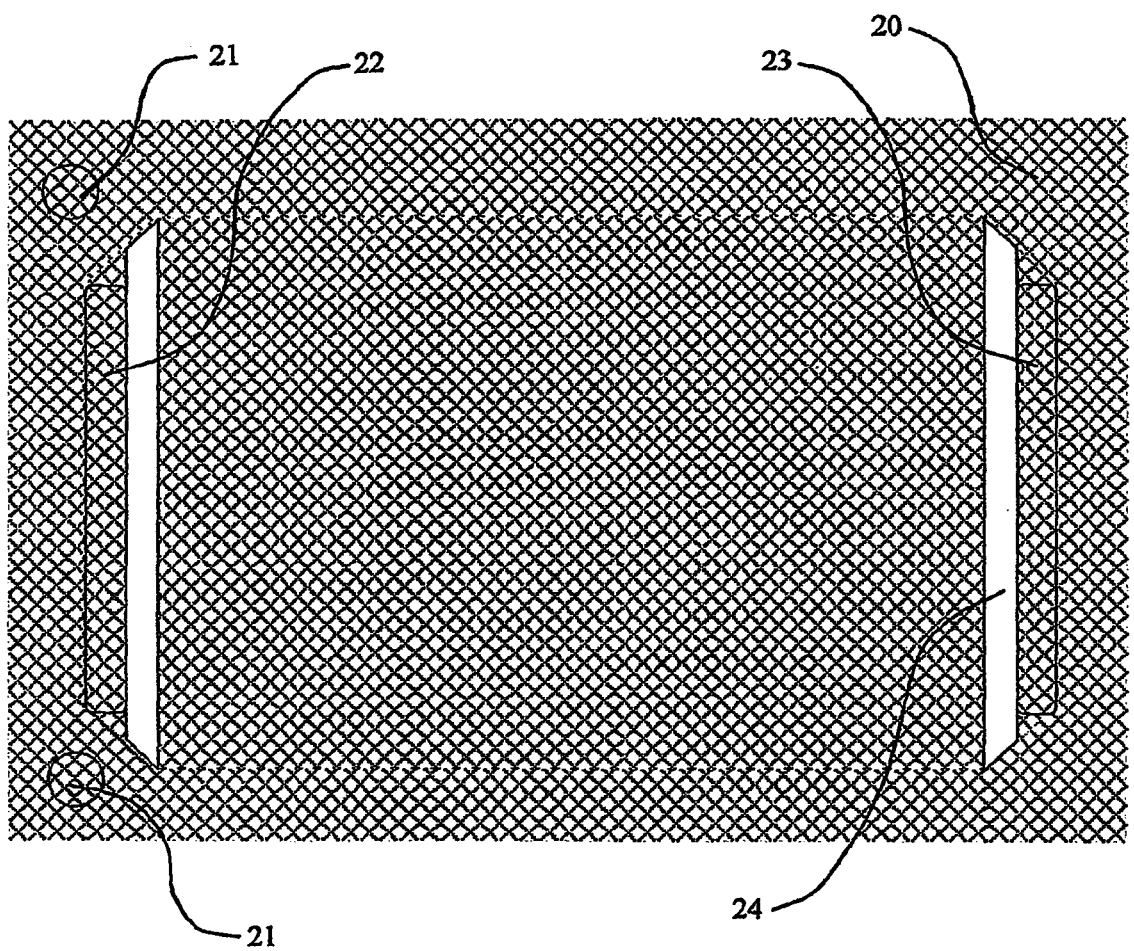
FIG. 10 is a plan view of a relatively thick screen spacer with a common product outlet and concentrate inlet manifold.

Such flow channeling and distribution effects may also enhance normal operation of an electrodeionization apparatus according to the present invention thereby providing more uniform flow distribution and/or allowing cell chamber configurations that would otherwise be susceptible to excessive flow channeling. FIGS. 9 and 10 illustrate two such further embodiments. As shown in FIG. 9, one spacer element 20 may be configured with a broad flat open central region quite distinct from the narrow compartments of prior art devices. The feed inlet 22 may be a broad slot rather than the round hole-like apertures 5, thus feeding an input at substantially uniform pressure at one end of the cell and providing a modified plug flow profile across the full area of the cell to a corresponding slot-like product outlet manifold 23 at the other end. Manifold 23 may align with and feed the concentrate inlet opening of an adjacent concentrate cell. The apertures 21, corresponding to apertures 4 of several earlier-described and illustrated embodiments, communicate with concentrate cell outlets in the assembled stack. The screen spacer in this embodiment thus provides a common product outlet and concentrate inlet manifold.

FIG. 10 is a plan view of a screen spacer having a similar architecture to that illustrated in FIG. 9, with a common product outlet and concentrate inlet manifold, which is especially useful when the spacer is substantially thicker than the screen and contains a bead filing many beads thick. The screen spacer is then assembled with a bead retainer 24 positioned to keep beads from reaching or blocking the outlet manifold 23. Other variations will be readily appreciated in view of these embodiments. Thus, rather than a slot-type manifold as illustrated, a smaller round inlet or outlet may communicate via a flow distributor—such as a fan-shaped opening or a set of channels in the solid portion—to effect uniform flow or pressure conditions for the inlet or outlet paths around a manifold. Such a flow distributor may also be integrated into a strainer/bead retainer assembly or insert. Similarly, a bead retainer may be provided at some distance from a smaller port, relying on an intervening screen region to remain free of beads and operate as a flow distributor.

It will be apparent to those skilled in the art that other changes and modifications may be made in the above-described apparatus and without departing from the scope of the invention herein, and it is intended that all matter contained in the above description shall be interpreted in an illustrative and not a limiting sense.

While the invention has been described in terms of preferred embodiments, claims appended hereto are intended to encompass all other embodiments which fall within the spirit of the invention.

We claim:

1. A spacer for use in an electrodeionization device, the spacer comprising a solid portion circumscribing an intended electrodeionization treatment cell and having a substantially uniform thickness so as to be stackable with sheets of ion exchange membrane to form said treatment cell, and a screen extending entirely across a central region of the solid portion corresponding to a region of flow within the treatment cell, said screen being integrated with said solid portion and further being configured to occupy said central region together with ion exchange or other functional electroactive filler material to thereby maintain a threshold membrane separation while permitting treatment flow through the cell.

2. The spacer of claim 1, wherein said screen constitutes a structural web reinforcing the solid portion against bowing and blow-out for permitting operation at elevated pressure.

3. The spacer of claim 2, wherein the screen extends to an outer perimeter substantially co-extensive with an outer perimeter of said solid portion.

4. The spacer of claim 2, wherein said solid portion has a thickness above several millimeters forming a thick cell, and the screen comprises strands having a dimension and strength to cross-brace the cell against blow out.

5. The spacer of claim 1, wherein said screen comprises first and second sets of strands crossing each other at an angle, at least one set of said sets of strands being operative to distribute flow across said central region.

6. The spacer of claim 5, wherein said at least one set of strands is dimensioned and oriented to guide a bead filling slurry at a velocity effective to distribute a bead filling in the cell.

7. The spacer of claim 1, comprising first apertures forming an inlet and/or outlet manifold for a dilute cell and being in flow communication with said central region of the dilute cell occupied by said screen, and a second aperture forming an inlet and/or outlet manifold for a concentrate cell, at least said second aperture passing through said solid portion whereby the second aperture is not in flow communication with said central region of the dilute cell.

8. The spacer of claim 1, wherein one of said first apertures forms a common manifold for product outlet of the dilute cell and fluid inlet of the concentrate cell.

9. The spacer of claim 1, wherein said screen contacts a membrane without overhang thereby avoiding trapping and isolating exchange beads for enhanced power utilization.

10. The spacer of claim 1, wherein the screen comprises first strands extending in parallel in a first direction in contact with a first membrane, and second strands extending transverse to said first direction in contact with a second membrane, said first and second strands contacting each other in a plane between the first and second membranes such that the screen supports the membrane at a separation at least as great as screen thickness while providing open flow passage in at least one of said first and second directions about points of membrane-screen contact.

11. Electrodeionization apparatus having a plurality of dilute cells stacked alternating with concentrate cells, each cell being defined by a dilute cell spacer or a concentrate cell spacer, respectively, and by first and second selectively permeable membranes, wherein at least said dilute cell spacer is a spacer according to claim 1.

12. The electrodeionization apparatus of claim 11, wherein the screen of the dilute cell spacer structurally secures the solid portion to sustain elevated pressure in the flow region without ballooning or blowout.

13. The electrodeionization apparatus according to claim 11, wherein the screen of the dilute cell spacer includes transverse flow-directing rails to enhance flow across the flow region.

14. The electrodeionization apparatus of claim 13, wherein the dilute cell is a thick cell and the rails are sized to distribute resin beads across the dilute cell during a fluidized bead filling operation.

15. A method of purifying a feed fluid, such method including the steps of:

(a) providing an electrodeionization apparatus having a plurality of dilute cells stacked alternating with concentrate cells, each cell being defined by a dilute cell spacer or a concentrate cell spacer, respectively, and by first and second selectively permeable membranes, wherein said dilute cell spacer is a spacer according to claim 1; and, (b) treating the fluid with the electrodeionization device whereby the fluid is effectively at least partially purified.

16. A spacer for use in an electrodeionization device, the spacer comprising a solid portion circumscribing an intended electrodeionization treatment cell and having a substantially uniform thickness so as to be stackable with sheets of ion exchange membrane to form said treatment cell, and a screen extending entirely across a central region of the solid portion corresponding to a region of flow within the treatment cell, said screen being integrated with said solid portion and further being configured to occupy said central region together with ion exchange or other functional electroactive filler material, strands of said screen being dimensioned and positioned to prevent migration of said filler material in use.

17. The spacer of claim 16, wherein the strands of said screen effectively retain beads from reaching a manifold or an adjacent cell.

18. A screen spacer element having a substantially uniform thickness for positioning between membrane elements of an electrodeionization device, said spacer element comprising:

(a) a substantially liquid-impermeable perimeter region having a thickness;

(b) a central region located within said perimeter region; and, (c) a screen element extending at least entirely across said central region such that the screened central region is permeable to liquid, whereby an inner edge of said perimeter region, which defines the boundary between said perimeter region and said central region, together with said membranes define an electrodeionization treatment cell.

19. A screen spacer element according to claim 18 wherein said screen element extends across at least a portion of said perimeter region.

20. A screen spacer element according to claim 18 wherein said screen element extends across substantially all of said perimeter region.

21. A screen spacer element according to any of claims 18-20 further comprising inlet and outlet apertures in said perimeter region.

22. A screen spacer element according to claim 21 wherein at least one of said apertures is not in communication with said central region.

23. A screen spacer element according to claim 21 wherein at least one of said apertures is in communication with said central region.

24. A screen spacer element according to claim 23 further comprising a particle retaining element positioned between said central region and at least one aperture in communication with said central region.

* * * * *